Aug. 28, 1923.
H. E. COLLVER
1,466,579
METHOD OF AND APPARATUS FOR TREATING FLUIDS
Original Filed Oct. 8, 1917
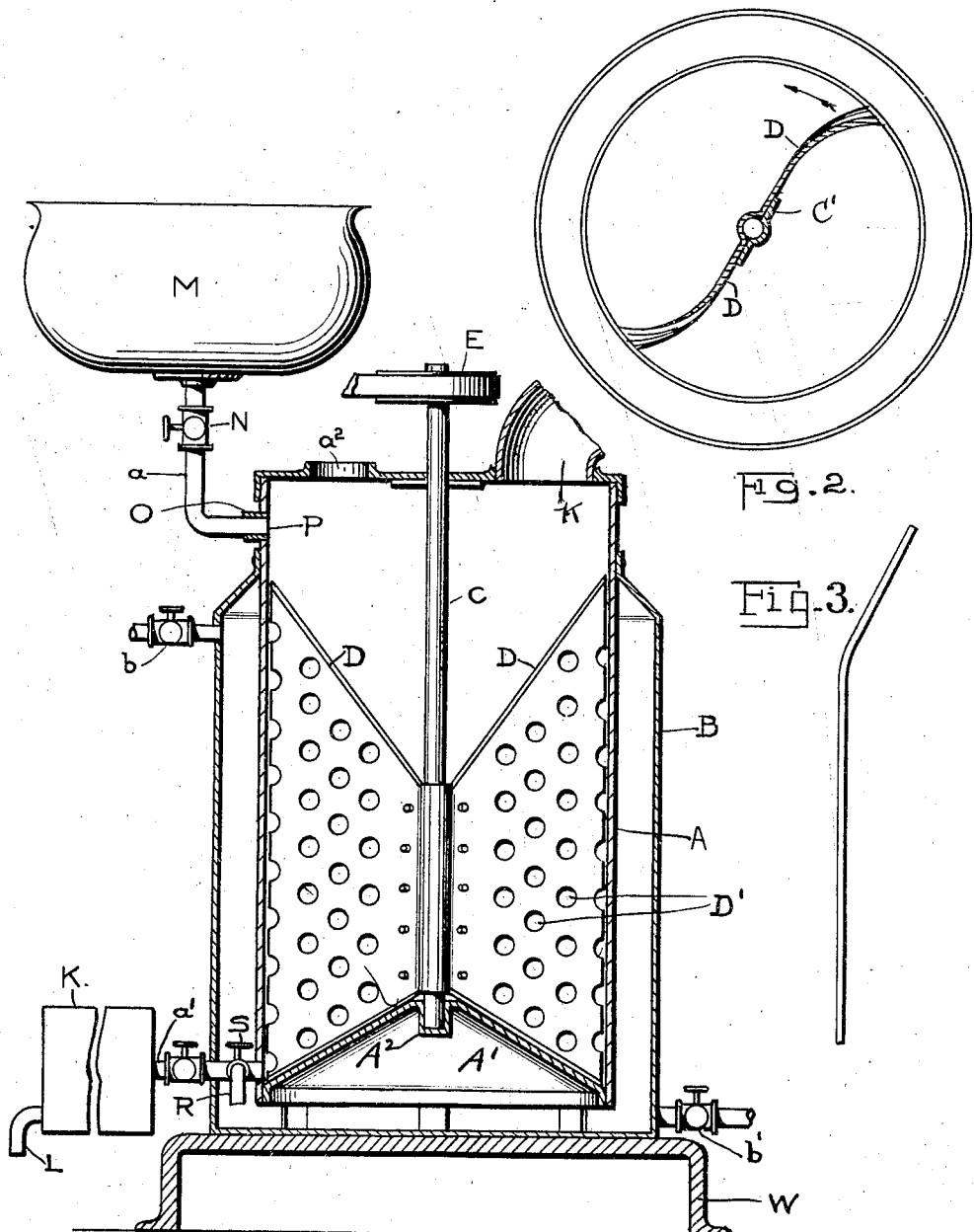

Patented Aug. 28, 1923.

1,466,579

UNITED STATES PATENT OFFICE.

HAROLD EUGENE COLLVER, OF SIMCOE, ONTARIO, CANADA, ASSIGNOR, BY MESNE ASSIGNMENTS, TO E. S. WERTZ, OF CLEVELAND, OHIO.

METHOD OF AND APPARATUS FOR TREATING FLUIDS.

Application filed October 8, 1917, Serial No. 195,433. Renewed December 28, 1922.

*To all whom it may concern:*

Be it known that I, HAROLD EUGENE COLLVER, a subject of the King of Great Britain, and a resident of Simcoe, in the county of Norfolk, Province of Ontario, Canada, have invented a new and useful Method of and Apparatus for Treating Fluids; and I do hereby declare the following to be a clear and exact description of the same when taken in connection with the accompanying drawings, forming part of this specification.

This invention relates to a method and apparatus for treating semi-liquid substances, and was first and aptly utilized in the concentration of milk products previously condensed in vacuum pans, as a step in the manufacture of congealed milk products, but, the method and apparatus are adapted for the concentration of all semi-liquid products.

Referring to the accompanying drawings:

Figure 1 is a section of a vertical plane, of an apparatus embodying the mechanical features of the invention, and with which the process may be carried out.

Figure 2 is a section in a horizontal plane, showing the preferred form of impeller blades.

Fig. 3 is an edge view of a propeller blade.

Like letters of reference, in each figure, indicate the same part.

The apparatus, illustrated, embodies in its construction a cylindrical container A, having its axis arranged substantially vertically, and preferably provided with an inwardly extending conical bottom A'. At the apex of the conical bottom there is provided a step bearing $A^2$, to support a vertical shaft C, which also has a bearing at the upper end of the container, and is adapted to support and effect rotation of impeller blades D, extending substantially radially from the shaft, but the outer edges of which are adapted for lateral expansion under centrifugal force so as to contact with the inner smooth liquid supporting surface of the container.

The impeller blades D, are provided with openings or perforations D' and these perforations are located not alone in the body of the blades, but at the edges thereof, the edge perforations, however, in the two blades being preferably out of alinement with each other, so that the entire inner surface of the container may be subjected to the action of the blades, and, at the same time the substance being treated will not bank up in front of the blades, as might be the case were no edge perforations provided. The upper end of the impeller shaft is provided with suitable means for imparting rotation thereto, and while the edges of the impeller blades may be just out of contact with the inner smooth surface of the container, under the effect of centrifugal force, they will be caused to contact therewith, and to exert a scraping action to effectually remove any possible adhering particles of milk or other products, and provide a smooth, clean surface, for the formation of a relatively thin body, or plurality of bodies of milk or of other materials being treated.

This radial action may be secured by making the impeller blades of strong metal, and curved, as shown in Figure 2, and slightly elastic.

Surrounding the cylindrical wall of the container is a steam or heating chamber B, which may, if desired, extend across beneath the bottom of the container, as shown, although this is not deemed necessary or important. Steam or other suitable medium for heating the substance being treated in the container, may enter through the supply pipe, guarded by a valve $b$, and condensation may be carried off through a valve discharge $b'$.

The entrance and exit ducts for the material to be treated are located preferably in the cylindrical wall of the container at top and bottom of same, and they are preferably of such size, and their openings, within the container, are of such character, that the material will pass in and out without banking up or increasing the thickness of the bodies of material, which are formed upon the wall of the container, as will be presently pointed out.

The semi-liquid materials are admitted to the container continuously, preferably from the top, and preferably at one inlet. As shown, the materials to be treated are supplied from a reservoir M, through a pipe $a$, having a regulating valve N therein, and connecting through a sleeved part O with the container $a$ so as to discharge onto the cylindrical surface thereof while the discharge for the treated material is continuous and through a valve controlled pipe V.

The whole apparatus is mounted on a suitable support W, and constitutes a unit ready for pipe and power connections when installed.

To prevent the substance treated from flowing over the upper end of the impeller blades, the upper ends are curved forwardly with relation to the direction of rotation, thus forcing the semi-liquid materials to pass beneath the side edges of the blades, this construction being well illustrated in Fig. 1.

In operation the cylindrical wall of the container is maintained at a suitable temperature for the materials treated, and the latter preferably enters the container in a stream, but may be allowed to diffuse themselves, upon the inner wall about the inlet opening.

The form which the materials take upon the treating surface, varies with the character of the materials treated, the rapidity with which they are introduced, with the amount of materials in the container at a given time, and with the rotary speed applied to the impeller blades.

The materials to be treated preferably enter the container at the inlet opening P, preferably in the form of a continuous stream which is directed by gravity through the central vapor zone, where the materials are caught by the impeller blades and forced in small masses, upon the concave heated treating surface of the container, and thereafter spread thereover in an irregular manner, and thereafter moved, thereover in an irregular manner, and from the container in a continuous stream.

By this method of introduction the materials are first forced upon the treating surface at a plurality of points throughout its extent, and substantially immediately moved from the first point of contact. A portion of the materials are first moved toward the opposite end of the container from the outlet when a considerable amount of materials is in the container, and later moved toward the outlet end. The line of lineal travel for the materials depends more or less upon their nature, and the amount in the container at a given time.

The materials do not follow a uniform line of lineal travel. When considered in connection with the action of the impeller blades, the method involves what might be termed disintegrating or rough treatment for the materials, as for instance to destroy butter fat globules and the structure, generally conceded to be fibrous in nature, surrounding the protein cells in milk products, while portions of the product treated are being evaporated while travelling in an irregular path over the inner surface of a heated cylinder, whether in the form of an irregular body of material of layer formation, or whether in broken formation as to the continuity of the product, and regardless of whether the container is vertically or horizontally disposed. The action of the impeller blades wiping the surface tends to divide the materials into a number of individual bodies.

The vapor of evaporation may escape through the outlet pipe K, from its own pressure, or through being connected with means for producing a vacuum within the container, a vacuum being desirable for the treatment of various products in this method of treatment. A peep-hole is provided in the wall of the cover of the container, as shown at $a^2$.

When power is applied to the shaft through the pulley E, the movement of the impeller blades forces the milk and other materials over the heated cylindrical treating surface, and, the impeller blades being elastic in nature and moving over the treating surface crush and destroy sugar, tartar, and mineral crystals, fibrous structures, and the like, as they flow over the treating surface. In this manner a disintegrating process is conducted simultaneously with an evaporating process. The amount of materials to be treated upon the inner surface of the container need not be sufficient to enable the impeller blades, through their movement, to maintain a constantly moving uniform layer of materials, travelling in a uniform line, spirally about the inner surface from one end of the container to the other end.

In a vertically disposed container the great bulk of material treated is moved by the impeller blades, then falls a short distance, and is caught by the impeller blades, moved again, and again falls, and so on throughout the treatment, especially so, when the density of the materials has been substantially increased. It is obvious, of course, that the improvements herein contemplated may be applied to an evaporator of the horizontal type, but since the parts will be arranged, generally, as illustrated, except that the disposition is changed from the vertical to the horizontal, it is thought unnecessary to illustrate this change in the drawings.

By this method there is a portion of the heated treating surface which is not necessarily covered with materials to be treated, and the body of material treated does not assume the form of a revolving liquid cylinder, travelling at uniform speed in a spiral direction, but rather, the material to be treated consists of a combination of material bodies moving more or less alternately spirally, irregularly, circumferentially, then downwardly, and then again in the same manner.

The speed of rotation of the impeller blades varies according to the material under treatment, and the character of treatment contemplated. Assuming that the valve N is entirely open the semi-fluid mass will flow from the supply pipe inwardly towards the center, or if the valve is partly closed the stream will engage directly with the surface. Assuming that the stream of material flows from the supply pipe towards the center, the same will be caught by the agitating blades, and thrown against the wall of the container, and have a downwardly moving tendency as well as a circumferentially moving tendency.

What is claimed is:

1. In an apparatus for evaporating semi-liquid substances, the combination of a vertically-disposed cylindrical container, means for applying to the cylindrical wall of the container a heating medium, said container having an inlet opening for the material to be treated at the periphery adjacent the upper end thereof, and an outlet for the treated material at the base adjacent the periphery thereof, said container also having a relatively large opening in the top for the rapid escape of vapors, said opening being disposed at a point spaced inwardly from the peripheral wall of the container; a vertically-disposed rotatable shaft in the container, and impeller blades mounted on the shaft, comprising arms of yieldable metal adapted to engage the inner peripheral surface of the container, the container having a substantially cone-shaped base, the upper edges of the blades inclining downwardly from the outer edge thereof to their point of connection with the shaft, and the lower edges of the blades inclining upwardly from their outer edge to their point of connection with the shaft, and said blades having in the outer edges thereof a series of vertically spaced by-pass openings, the openings in one blade being arranged in staggered relation with the openings in the succeeding blade, for the ready passage of the material, and said blades also having openings in the body portion thereof.

2. In an apparatus for evaporating semi-liquid substances such as partially condensed milk, the combination of a vertically disposed cylindrical container, means for applying exteriorly to the cylindrical wall of the container a heating medium, said container having an inlet opening for the material to be treated at the periphery adjacent the upper end thereof and an outlet at the base thereof adjacent the periphery of the container, and said container also having a relatively large vapor discharge opening in the top thereof at a point disposed inwardly from the periphery of the container, a vertically disposed rotatable shaft in the container, and impeller blades for engaging and imparting movement to the material, said blades being mounted on the shaft adapted to engage the inner peripheral surface of the container, and the said blades being yieldable and constructed and arranged to permit the material to pass through the same at the periphery thereof.

3. In an apparatus for evaporating semi-liquid substances such as partially condensed milk, the combination of a vertically disposed cylindrical container, means for applying exteriorly to the cylindrical wall of the container a heating medium, said container having an inlet opening for the material to be treated at the periphery adjacent the upper end thereof and an outlet at the base thereof, and said container also having a relatively large vapor discharge opening in the top thereof at a point disposed inwardly from the periphery of the container, a vertically disposed rotatable shaft in the container, and impeller blades of metal adapted to engage and move the material circumferentially, said blades being mounted on the shaft and adapted to engage the inner peripheral surface of the container, and the blades having a series of openings therethrough for the passage of material therethrough and thereby prevent banking of the material in front of the blades.

4. In an apparatus for evaporating semi-liquid substances such as partially condensed milk, the combination of a vertically disposed cylindrical container, means for applying exteriorly to the cylindrical wall of the container a heating medium, said container having an inlet opening for the material to be treated at the periphery adjacent the upper end thereof and an outlet at the base thereof, and said container also having a vapor discharge opening in the top thereof at a point disposed inwardly from the periphery of the container, a vertically disposed rotatable shaft in the container, and impeller blades mounted on the shaft adapted to engage the inner peripheral surface of the container, the blades being formed of yieldable metal and having cutout parts in the edges thereof, the said cutout parts in succeeding blades being out of registration and apertures through the body portion thereof, whereby to prevent banking of the material in front of the blades in the movement of the latter.

5. In an apparatus for evaporating semi-liquid substances such as partially condensed milk, the combination of a vertically disposed cylindrical container, means for applying to the cylindrical wall thereof steam heat, a receptacle for the material, a conduit leading from said receptacle to the upper portion of the container adjacent the periphery thereof whereby to supply material to the container, rotatable metallic blades within the container extending longitudinally adjacent the peripheral wall of the container, said blades having alternately arranged cutout parts in the outer edge thereof, permitting the material to pass by the blades through said cutout parts, and said container having an opening for the free escape of vapors.

6. In an apparatus for evaporating semi-liquid substances such as partially condensed milk, the combination of a vertically disposed cylindrical container, means for applying steam heat to the peripheral wall thereof, said container having a conical outlet end with a discharge opening adjacent the edge thereof, and said container having an inlet for the material adjacent the opposite end thereof, and also having in one of its ends an opening for the free escape of vapors, and rotatable impeller blades positioned in the container and adapted to apply the material in layer formation on the peripheral wall of the container, said blades being provided with alternately placed openings through which the material under treatment may pass, thereby preventing the material from banking up in front of the blades in the movement of the latter.

7. In an apparatus for evaporating semi-liquid substances such as partially condensed milk, the combination of a vertically disposed cylindrical container, the inner wall of which constitutes a treating surface, means for applying steam heat to the exterior surface of the container, the said container having an inlet for the material adjacent the periphery at one end thereof, and a discharge for the treated material adjacent the opposite end of the periphery thereof, and said container having in one of the ends an opening for the free escape of vapor from the center of the container, and means for applying the material in the form of a layer to the inner peripheral surface of the container, comprising rotatable metallic impeller blades adapted to maintain the surface cleansed of adhering particles, and said blades being adapted to yield and having by-pass openings for the passage of the material whereby to prevent banking up of the material in advance of the blades.

8. The method of treating semi-liquid substances such as partially condensed milk, to concentrate them by evaporation, which consists of introducing the material into the upper end of a vertically disposed cylindrical container, applying steam heat to the wall of the container, subjecting said material to the action of rotatable conveyors, thereby causing the material so introduced into the container to move circumferentially and endwise in layer formation over the interior surface of the cylindrical wall of the container, breaking up the particles of material forming the layer, and simultaneously maintaining the cylindrical treating surface free from adhering particles of the material without banking the material in front of the conveyor members, and allowing the vapors of evaporation to freely escape through a copious discharge opening in one end of the container.

9. In an evaporating apparatus, the combination of a cylindrical container, means for applying to the cylindrical wall of the container a heating medium, said container having an inlet opening for the material adjacent one end thereof, and an outlet opening for the treated material adjacent the opposite end thereof, and said container also having a relatively large opening for the escape of vapors, in one of its ends, a substantially centrally disposed rotatable shaft, circumferentially spaced blades on said shaft, said blades projecting from the shaft to a point adjacent the periphery of the container and having a series of by-pass openings for the material throughout the body thereof.

10. In an evaporating apparatus, the combination of a cylindrical container, means for applying to the cylindrical wall of the container a heating medium, said container having an inlet opening for the material adjacent one end thereof, an outlet opening for the treated material adjacent the opposite end thereof, said container also having a relatively large opening for the escape of vapors in one of its ends, a substantially centrally-disposed rotatable shaft, circumferentially spaced blades on said shaft, said blades having a series of apertures therethrough and projecting from a point adjacent said shaft to a point in contact with the inner surface of the container, and said blades being constructed of yieldable metal.

11. In an evaporating apparatus, the combination of a vertically disposed cylindrical container, means for supplying heat to the cylindrical wall of the container, said container having an inlet adjacent one end for the material and an outlet adjacent the opposite end for the treated material, and said container having in one end a copious opening for the free discharge of vapors, means for applying circumferential movement to the material, comprising rotatable blades extending longitudinally of and to a point adjacent the periphery of the container, said blades having by-pass openings for the material in the free edges thereof, and the openings in succeeding blades being out of registration with one another.

12. In an evaporating apparatus, the combination of a vertically disposed cylindrical container, means for supplying heat to the cylindrical wall of the container, said container having an inlet adjacent one end for the material and an outlet adjacent the opposite end for the treated material, and said container having in one end a copius opening for the free discharge of vapors, and means for applying circumferential movement to the material, comprising rotatable blades extending longitudinally of and adjacent the periphery of the container, said blades having by-pass openings for the material in the free edges thereof, and the openings in succeeding blades being out of registration, and the said blades being constructed of yieldable material and adapted to contact with the interior surface of the container, whereby during the process of moving the material over said surface the said surface will be simultaneously and continuously cleansed.

13. In an apparatus of the character described, the combination of a cylindrical container, means for applying to the cylindrical wall of the container a heating medium, said container having an inlet opening for the material adjacent one end thereof, and an outlet opening for the treated material adjacent the opposite end thereof, and said container also having a relatively large opening for the escape of vapors from one end, and curved blades of yieldable material in contact with the peripheral surface of the container and projecting in opposite directions from a point substantially centrally of the container, said blades having a series of by-pass openings for the material throughout the body thereof.

14. In an apparatus of the character described, the combination of a cylindrical container, means for applying to the cylindrical wall of the container a heating medium, said container having an inlet opening for the material adjacent one end thereof, and an outlet opening for the treated material adjacent the opposite end thereof, and said container also having a relatively large opening for the escape of vapors from one end, curved blades of yieldable material in contact with the peripheral surface of the container and projecting in opposite directions from a point substantially centrally of the container, said blades having a series of by-pass openings for the material throughout the body thereof, and said blades also having at their engaging edges cut-out parts.

15. In an evaporating apparatus, the combination of a substantially cylindrical container, means for applying heat to the cylindrical wall of the container, said container having an inlet at one end and an outlet at its opposite end for the material, a centrally disposed rotatable shaft in the container, metallic blades projecting from said shaft and having yieldable parts to engage the surface of the container, said blades having in the edges thereof cut-out parts, and said blades at the inlet end of the container having an inclined end whereby to leave a space between said shaft and the edge portion of said end of the blades, and said container having an enlarged vapor escape communicating with said space.

16. In an evaporating apparatus, the combination of a vertically disposed container having an inlet opening at the top thereof, and an outlet opening for the treated material at the base thereof, adjacent the periphery of the container, and said container also having an enlarged opening for the escape of vapors, the container having a cone-shaped base, a vertically disposed shaft having a bearing centrally of said base, and conveyor blades mounted directly on said shaft and at the lower edges thereof shaped to correspond with the shape of the base of the container, said blades having by-pass openings therethrough for the material, and means for supplying heat to the wall of the container.

HAROLD EUGENE COLLVER.

Witnesses:
  C. A. CHALLEN,
  J. D. GLASS.